United States Patent

Schroer

[15] 3,645,234
[45] Feb. 29, 1972

[54] ANIMAL FEEDING DEVICE

[72] Inventor: Gary J. Schroer, Prairie Village, Kans.

[73] Assignee: Schroer Manufacturing Company, Inc., Kansas City, Mo.

[22] Filed: Sept. 21, 1970

[21] Appl. No.: 73,842

[52] U.S. Cl. ..........................119/18, 119/72.5, 128/276
[51] Int. Cl. ..........................................................A01k 7/02
[58] Field of Search ..................119/72.5, 75, 51, 18; 128/2, 128/214, 221

[56] References Cited

UNITED STATES PATENTS

| | | | |
|---|---|---|---|
| 2,460,641 | 1/1949 | Kleiner | 128/214 |
| 2,946,308 | 7/1960 | Harris | 119/18 |
| 3,228,377 | 1/1966 | Grassano | 119/72.5 |
| 3,251,342 | 5/1966 | Kay | 119/18 |
| 3,469,572 | 9/1969 | Nehring | 128/2 |

FOREIGN PATENTS OR APPLICATIONS

| | | | |
|---|---|---|---|
| 584,121 | 9/1959 | Canada | 119/72.5 |
| 1,239,808 | 5/1959 | Germany | 128/221 |

Primary Examiner—Aldrich F. Medbery
Attorney—Fishburn, Gold and Litman

[57] ABSTRACT

An animal feeding device for mounting on animal cages, for example, cages for primates, monkeys and the like, includes a mounting plate secured to an animal cage and having a bracket extending outwardly therefrom for removably supporting a feeding tube which has one portion extending into the animal cage and an other portion with a beveled and sharpened end to puncture and penetrate a food container in response to operation of a container moving and holding mechanism. A seal member engages the container and feeding tube preventing leakage.

11 Claims, 5 Drawing Figures

PATENTED FEB 29 1972 3,645,234
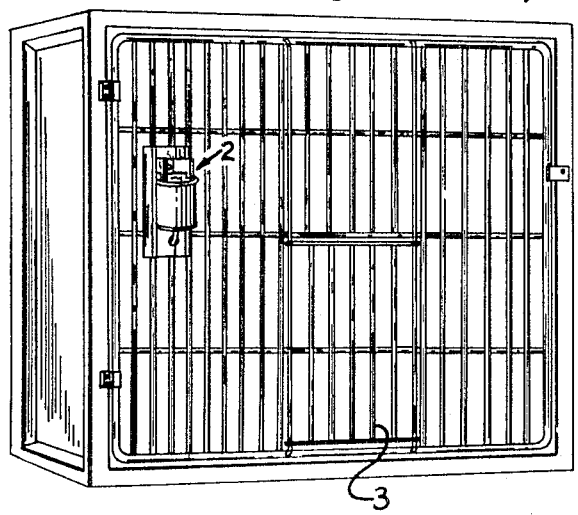
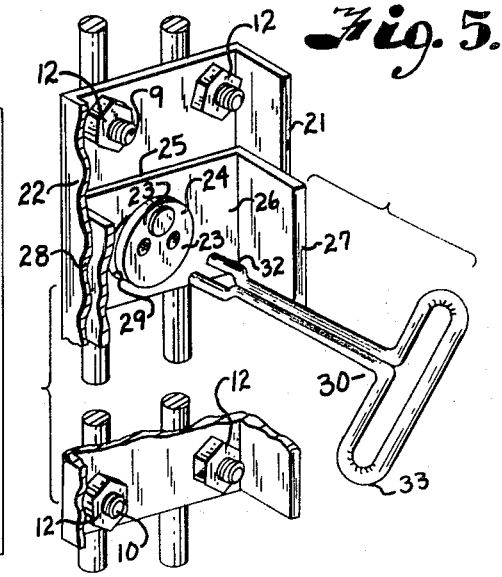
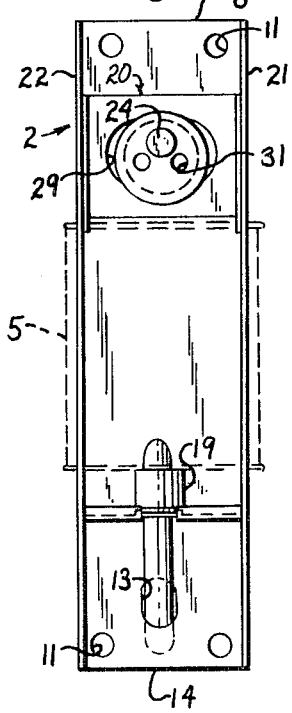
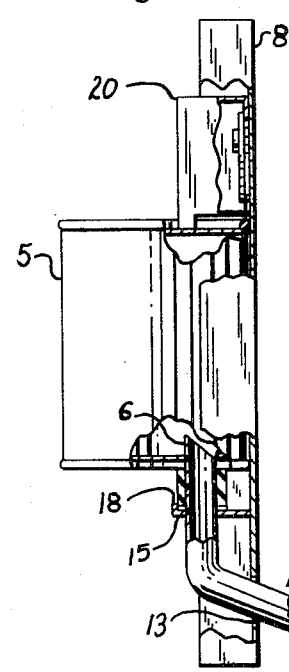
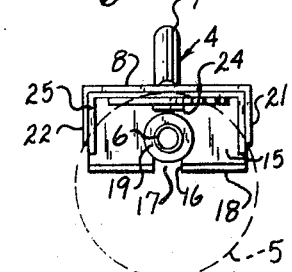
INVENTOR.
Gary J. Schroer
BY Fishburn, Gold & Litman
ATTORNEYS

ANIMAL FEEDING DEVICE

The present invention relates to animal feeding devices for animal cages and more particularly to an animal feeding device constructed to provide food and water for animals, such as primates and the like, in laboratories, zoos and the like, and to facilitate sanitary feeding of caged animals.

Certain animals, particularly primates and the like, are well known to be highly prone to displace and upset food and water receptacles within their cages causing unsightly and unsanitary conditions. Accordingly, cages for such animals must have feeding and watering devices which are securely fastened to resist the natural tendency displayed by the primates in dislodging feeding and watering devices.

The principal objects of the present invention are: to provide an animal feeding device which is particularly easy to securely install on an exterior side of a portion of an animal cage; to provide such an animal feeding device which is particularly difficult for animals, for example, primates and the like, to remove from the cage; to provide such an animal feeding device which is adapted to supply either food or water to the animals within the cage in a sanitary manner that avoids contamination of the food, cage and animal; to provide such an animal feeding device having a feeding tube which is easily removed and replaced from the exterior of the cage for cleaning and sterilizing, but which cannot be removed from the interior of the cage; to provide such an animal feeding device which is operative to form an opening in a food container and seal the opening so formed thereby providing sanitary food and water for the animal within the cage without any contact of a person with surfaces to be contacted by the food or water; and to provide such an animal feeding device which is positive in operation, simply mounted, durable in construction, economical to manufacture, and particularly well adapted for the proposed use.

Other objects and advantages of this invention will become apparent from the following description taken in connection with the accompanying drawings wherein are set forth by way of illustration and example, certain embodiments of this invention.

FIG. 1 is a perspective view of an animal feeding device embodying features of the present invention and showing same mounted on an exterior of an animal cage.

FIG. 2 is a front elevational view of the animal feeding device.

FIG. 3 is a side elevational view of the animal feeding device with portions broken away to show the feeding tube, container and seal.

FIG. 4 is a plan view of the animal feeding device with portions broken away to show the container mover and holder.

FIG. 5 is a perspective view of a key engageable with the container mover for selectively moving same into and out of engagement with the container.

Referring more in detail to the drawings:

The reference numeral 1 generally designates an animal cage particularly adapted to house animals, for example, primates and the like, in laboratories or other locations. An animal feeding device 2 is secured on an exterior side of a portion of the animal cage 1, preferably on a door 3, and has a feeding tube 4 removably mounted thereon for conveying the contents of a food container 5 to an animal within the cage 1. The feeding tube 4 has one end 6 in communication with the food container 5 and the other end 7 extending into the cage 1 whereby an animal within the cage 1 may withdraw the contents of the food container 5 by draining same through the feeding tube 4.

The feeding device 2 may be applied to any wall of a cage, but it is preferred to mount it on a door for better access and control. In the illustrated structure, a feeder holding member in the form of a mounting plate 8 is suitably secured to the animal cage 1 on an exterior side of a portion of the door 3 or cage 1. Upper and lower U-bolts 9 and 10 respectively are shown as fasteners to avoid sharp edges. The U-bolts extend around selected bars in the cage 1 or the door 3 and through spaced apertures 11 in the mounting plate 8. The ends of the U-bolts are threaded and nuts 12 are secured thereon against the plate 8 to clamp same to the cage bars. The mounting plate 8 has an aperture 13 adjacent a lower end 14 thereof to permit a lower end of the feeding tube 4 to extend therethrough and into the animal cage 1, as later described.

The feeding tube 4 is removably supported on the mounting plate 8 to permit the tube 4 to be easily removed for cleaning and sterilized and then replaced for use with another food container. In the illustrated structure, a bracket 15 is mounted on the mounting plate 8 and extends outwardly therefrom to provide support for the feeding tube 4. The bracket 15 is illustrated as a generally planar member suitably secured to the mounting plate 8, as by welding. The bracket 15 is positioned adjacent the lower end 14 of the mounting plate 8 with the aperture 13 between the end 14 of the mounting plate 8 and the bracket 15. The bracket 15 has a slot 16 therein sized to receive the feeding tube 4 and the slot 16 has an open end 17 spaced from the mounting plate 8 whereby the feeding tube 4 is removable by moving same outwardly through the open end 17 of the slot 16 and away from the mounting plate 8.

The feeding tube 4 is maintained in position on the bracket 15 by means which cause the tube 4 to be extremely difficult or impossible to remove from bracket 15 by an animal within the cage 1. In the illustrated structure, the bracket 15 has an upturned edge flange 18 engageable by a seal member 19, as later described, mounted on the feeding tube 4 thereby maintaining the feeding tube 4 in position for removal of the contents of the food container 5.

For removal the one end 6 of the feeding tube 4 must be maneuvered upwardly and toward the cage 1 to permit the seal member 19 to clear the edge flange 18 and then outwardly and downwardly to move the feeding tube away from the bracket 15 and then outwardly and upwardly to withdraw the lower portion through the aperture 13. All the described movements have been found to be easy from outside the cage 1 and difficult from inside the cage 1 and against the instincts of the animals within the cage 1.

It is desirable to provide means on the mounting plate 8 to properly position a food container 5 relative to the feeding tube 4 and a container moving means 20, as later described, to thereby guide the container 5 into position to be penetrated by the feeding tube 4, therefore, a pair of spaced edge flanges 21 and 22 extend outwardly from the mounting plate 8 and the edge flanges 21 and 22 are positioned to be engaged by the food container 5 and thereby guide same into engagement with the one end 6 of the feeding tube 4 and to position the food container 5 to be engaged by the container moving means 20.

The feeding tube 4 is illustrated as an elongated tubular member having a lower portion extending at an angle with an upper portion and extending through the aperture 13 and into the animal cage 1. The one end 6 of the feeding tube 4 is sharpened and beveled thereby providing means for penetrating the food container 5 when the container moving means 20 moves the container 5 downwardly over the sharpened upper end 6.

The seal member 19 is preferably a suitable resilient material adapted to sealingly engage the container 5 around an opening cut or formed therein by the sharpened and beveled upper end 6, such as gum rubber, and the seal member 19 is mounted on the upper portion of the feeding tube 4 adjacent the sharpened upper end 6 and the seal member 19 is engageable with the bracket 15 and the edge flange 18 thereof, whereby the feeding tube 4 is supported in a position for use by an animal in the cage 1 and the seal member 19 is positioned to seal an opening formed by the sharpened upper end 6 of the feeding tube 4 when the container moving means 20 moves the food container 5 into engagement with the seal member 19.

The container moving means 20 is illustrated as a cam mechanism mounted on the mounting plate 8 and having portions engageable with the food container 5 and the cam mechanism is operative to move the container 5 over the sharpened upper end 6 of the feeding tube 4 to form an opening in the food container 5 and to move the container 5 into sealing engagement with the seal member 19. The cam mechanism is also operative to hold the food container 5 in the sealed position, whereby an animal within the animal cage 1 may withdraw food from the food container 5 by siphoning same through the feeding tube 4.

In the illustrated structure, the cam mechanism includes a cam member 23 movably mounted on the mounting plate 8 and positioned above the bracket 15, as by being rotatably mounted on a shaft 24 extending outwardly from the mounting plate 8. A movable member 25 has a generally planar portion 26 slidingly engageable with the mounting plate 8 and a pair of spaceed edge flanges 27 and 28 slidingly engageable with the edge flanges 21 and 22 respectively, of the mounting plate 8. The planar portion 26 of the movable member 25 has a cam aperture 29 therein which has a surface engageable by a periphery of the cam member 23 whereby moving the cam member 23 is operative to move the movable member 25 into engagement with the food container 5 to move same into the sealed position.

A key 30 is operatively engageable with the cam member 23 for moving same to effect movement of the container 5 and in the illustrated structure, the cam member 23 has a plurality of recesses 31 in an exterior surface thereof and the key 30 is an elongated member having a plurality of tines 32 at one end thereof with the tines 32 being shaped to be received within the recesses 31 in the cam member 23 whereby turning the key 30, as by a handle portion 33 at the other end thereof, is operative to effect turning of the cam member 32 and movement of the movable member 25 toward and away from the container 5.

By way of operation of an animal feeding device 2, constructed as described and illustrated, the mounting plate 8 is secured in position on an exterior side of the animal cage 1, as by the U-bolts 9 and 10 and the nuts 12. The feeding tube 4 having the seal member 19 mounted thereon adjacent the sharpened upper end 6 is positioned with the seal member 19 supported on the bracket 15 and the lower end portion of the feeding tube 4 extending through the aperture 13 and into the animal cage 1. A food container 5 having a suitable food therein, is positioned between the edge flanges 21 and 22 of the mounting plate 8 and moved into engagement with the sharpened upper end 6 of the feeding tube 4. The key 30 is engaged in the cam member 23 to selectively move the movable member 25 into engagement with the food container 5 and move same to effect penetration thereof by the sharpened end 6 of the feeding tube 4 and sealing engagement with the seal member 19 thereby sealing the opening so formed. The contents of the container 5 preferably are liquids having sufficient viscosity to resist draining from the container when an opening is formed therein by the sharpened end 6 of the feeding tube 4, however, the container 5 is closed except for the opening formed by the sharpened end 6 of the feeding tube 4 whereby a suction or the like must be applied to the end 7 of the feeding tube 4 to remove the contents of the container 5. This is also the same if the contents is a low viscosity, such as water or the like. When the animal within the cage 1 has emptied the container 5, the empty container 5 may be removed by using the key 30 to move the movable member 25 out of engagement with the container 5. After the food container 5 has been removed, the feeding tube 4 may be removed and cleaned and sterilized in any conventional manner and replaced in the animal feeding device 1, in preparation for installation of the next food container.

The animal feeding device 2 is, therefore, particularly designed to provide animals, such as primates and the like, in laboratories under close observation and study with a controlled feeding of water, foods, drugs and the like, while maintaining the animal free from foreign materials. The feeding device 2 is also adapted to maintain all surfaces contacted by water, food, drugs and the like, for the animal in a sanitary and sterile condition.

It is to be understood that while I have illustrated and described one form of my invention, it is not to be limited to the specific form or arrangement of parts herein described and shown.

What I claim and desire to secure by Letters Patent is:

1. An animal liquid feeding device comprising:
   a. a feeder holding member secured to an animal cage on an exterior side of a portion of the cage;
   b. a feeding tube having one end portion extending into the animal cage for contact by the animal;
   c. sharpened end means on the other end of said feeding tube for penetrating a container of food, and sealing means between the tube and container engaging same around the opening;
   d. actuating means on said container holding means and movable relative to the container and engageable therewith to effect penetration of the container by said feeding tube sharpened end; and
   e. means on said feeder holding member and engageable with the container of food for holding same with said one end portion of the feeding tube extending into the animal cage whereby an animal within the cage may withdraw food from the food container by siphoning through said feeding tube.

2. An animal feeding device as set forth in claim 1 including means on said feeder holding member for removably supporting said feeder tube.

3. An animal feeding device as set forth in claim 1 wherein said container holding means includes a cam mechanism having a movable member engageable with the food container for moving same into engagement with said container penetrating and sealing means.

4. An animal feeding device as set forth in claim 1 wherein said feeder holding member includes a mounting plate, said animal feeding device including means on said mounting plate engageable by the food container for guiding same into engagement with said container penetrating means and positioning the container to be engaged by said container holding means.

5. An animal feeding device as set forth in claim 1 wherein:
   a. said feeder holding member includes a mounting plate having a bracket mounted thereon and extending outwardly therefrom;
   b. said bracket has a slot therein sized to receive said feeding tube, said slot having an open end spaced from said mounting plate whereby said feeding tube is removable; and
   c. said bracket has means thereon adjacent said slot and engageable by said container sealing means thereby maintaining said feeding tube in position for removal of the contents of the food container.

6. An animal feeding device as set forth in claim 1 wherein said container holding means includes:
   a. a cam member movably mounted on said feeder holding member;
   b. a movable member having portions engageable with said feeder holding member and the food container and having a cam surface engageable by said cam member; and
   c. means operatively engageable with said cam member for moving same thereby moving the food container into the sealed position.

7. An animal feeding device comprising:
   a. an elongated mounting plate and means for securing same to an animal cage on an exterior side of a portion of the cage;
   b. a bracket mounted on said mounting plate adjacent one end thereof and extending outwardly therefrom;
   c. an elongated feeding tube supported on said bracket intermediate the ends thereof and having one end sharpened to penetrate a food container and the other end positioned within the animal cage;
   d. a seal member mounted on said feeding tube adjacent the sharpened end thereof, said seal member being engageable with said bracket for supporting said feeding tube and engageable by the food container to seal an opening therein formed by said sharpened end of said feeding tube; and e. a cam mechanism having portions selectively movable into and out of engagement with the food container, said cam mechanism being operative to move the food container to effect penetration thereof by the sharpened end of the feeding tube and sealing of the opening so formed by effecting engagement of the food container with said seal member.

8. An animal feeding device as set forth in claim 7 wherein:
a. said mounting plate has an aperture therein between said bracket and one end of said mounting plate, the aperture being sized to permit said feeding tube to extend therethrough;
b. said bracket has a slot therein sized to receive said feeding tube, said slot having an open end spaced from said mounting plate whereby said feeding tube is removable; and
c. said bracket has an edge flange engageable by said seal member thereby maintaining said feeding tube in position for removal of the contents of the food container.

9. An animal feeding device as set forth in claim 7 wherein said mounting plate has spaced edge flanges extending outwardly therefrom, said edge flanges being positioned to be engaged by the food container and thereby guide same into engagement with the sharpened end of said feeding tube and position the food container to be engaged by said cam mechanism portions.

10. An animal feeding device as set forth in claim 9 wherein said cam mechanism includes:
a. a cam member movably mounted on said mounting plate and positioned above said bracket;
b. a movable member having a generally planar portion slidingly engageable with said mounting plate, said movable member having spaced edge flanges slidingly engageable with said edge flanges of said mounting plate;
c. a cam aperture within said movable member and having a surface engageable by said cam member; and
d. means operatively engageable with said cam member for moving same thereby moving said movable member into engagement with the food container to move same into the sealed position.

11. An animal feeding device as set forth in claim 10 wherein:
a. said cam member has a plurality of recesses in an exterior surface thereof; and
b. said cam member moving means is an elongated member having a plurality of tines at one end thereof and a handle portion at the other end of the elongated member for turning same, said tines being shaped to be received within said recesses in said cam member whereby turning said elongated member effects turning of said cam member and movement of said movable member.

* * * * *